US008848264B2

(12) United States Patent
Mori

(10) Patent No.: US 8,848,264 B2
(45) Date of Patent: Sep. 30, 2014

(54) IMAGE READING APPARATUS

(71) Applicant: Brother Kogyo Kabushiki Kaisha, Nagoya (JP)

(72) Inventor: Kosuke Mori, Handa (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/035,715

(22) Filed: Sep. 24, 2013

(65) Prior Publication Data
US 2014/0085691 A1 Mar. 27, 2014

(30) Foreign Application Priority Data
Sep. 28, 2012 (JP) ................. 2012-215649

(51) Int. Cl.
H04N 1/04 (2006.01)
H04N 1/00 (2006.01)
H04N 1/12 (2006.01)
H04N 1/32 (2006.01)
H04N 1/10 (2006.01)
H04N 1/193 (2006.01)

(52) U.S. Cl.
CPC ....... *H04N 1/00084* (2013.01); *H04N 1/00031* (2013.01); *H04N 2201/0081* (2013.01); *H04N 1/00649* (2013.01); *H04N 1/1013* (2013.01); *H04N 1/121* (2013.01); *H04N 1/193* (2013.01); *H04N 1/3263* (2013.01); *H04N 1/00076* (2013.01); *H04N 1/00705* (2013.01); *H04N 1/0005* (2013.01); *H04N 1/00063* (2013.01); *H04N 1/00734* (2013.01); *H04N 1/12* (2013.01); *H04N 1/00745* (2013.01); *H04N 1/00013* (2013.01)
USPC ........... 358/498; 358/497; 358/486; 399/262; 399/258; 271/10.11; 271/264

(58) Field of Classification Search
CPC .......... H04N 1/00615; H04N 1/00649; H04N 1/00687; H04N 1/00694; H04N 1/00705; H04N 1/00734; H04N 1/00745; H04N 1/00822; H04N 1/1013
USPC ................ 358/498, 1.12, 497, 1.13, 1.5, 496; 271/10.11, 264, 117, 126, 225, 3.14, 271/3.19, 9.08, 109, 10.01, 147, 162, 274, 271/4.1, 97, 9.13; 399/262, 258, 260, 113, 399/119, 254, 263, 388, 67, 118, 12, 27, 399/301, 313, 329, 350, 358, 381, 393, 66, 399/82, 90
See application file for complete search history.

(56) References Cited

U.S. PATENT DOCUMENTS 5,816,569 A * 10/1998 Hoshi et al. .................. 271/117
5,862,446 A 1/1999 Hashizume et al.
(Continued)

FOREIGN PATENT DOCUMENTS

JP S62-136167 A 6/1987
JP S62-154950 A 7/1987
(Continued)

*Primary Examiner* — Negussie Worku
(74) *Attorney, Agent, or Firm* — Merchant & Gould PC

(57) ABSTRACT

An image reading apparatus comprising: a reading unit; a feeding unit; a carriage; a motor-side transmission gear for transmitting power from a motor; a feeding unit-side transmission gear for transmitting the power to the feeding unit in a feeding reading of reading an image of the document fed by the feeding unit; a carriage-side transmission gear for transmitting the power to the carriage in a moving reading of reading an image of the document while moving the carriage; a switching gear configured to be switched between a feeding unit-side position and a carriage-side position; a sensor; and a control device configured to, when it is determined that the jam has occurred, drive the motor in a direction of releasing a meshed state between the feeding unit-side transmission gear and the switching gear.

10 Claims, 7 Drawing Sheets

(56) References Cited

U.S. PATENT DOCUMENTS

| | | | |
|---|---|---|---|
| 5,887,866 A * | 3/1999 | Yamauchi et al. | 271/116 |
| 7,154,639 B2 * | 12/2006 | Chien | 358/474 |
| 8,416,475 B2 * | 4/2013 | Aoki et al. | 358/498 |
| 8,634,114 B2 * | 1/2014 | Mori | 358/474 |
| 8,693,072 B2 * | 4/2014 | Osakabe et al. | 358/498 |
| 2002/0018686 A1 | 2/2002 | Oshima et al. | |
| 2002/0131092 A1 | 9/2002 | Tanaka et al. | |

FOREIGN PATENT DOCUMENTS

| | | |
|---|---|---|
| JP | H01-266529 A | 10/1989 |
| JP | H02-013359 U | 1/1990 |
| JP | H05-307293 A | 11/1993 |
| JP | H10-051598 A | 2/1998 |
| JP | H10-123804 A | 5/1998 |
| JP | H10-164312 A | 6/1998 |
| JP | 2000-266156 A | 9/2000 |
| JP | 2002-262024 A | 9/2002 |
| JP | 2006-086817 A | 3/2006 |

* cited by examiner

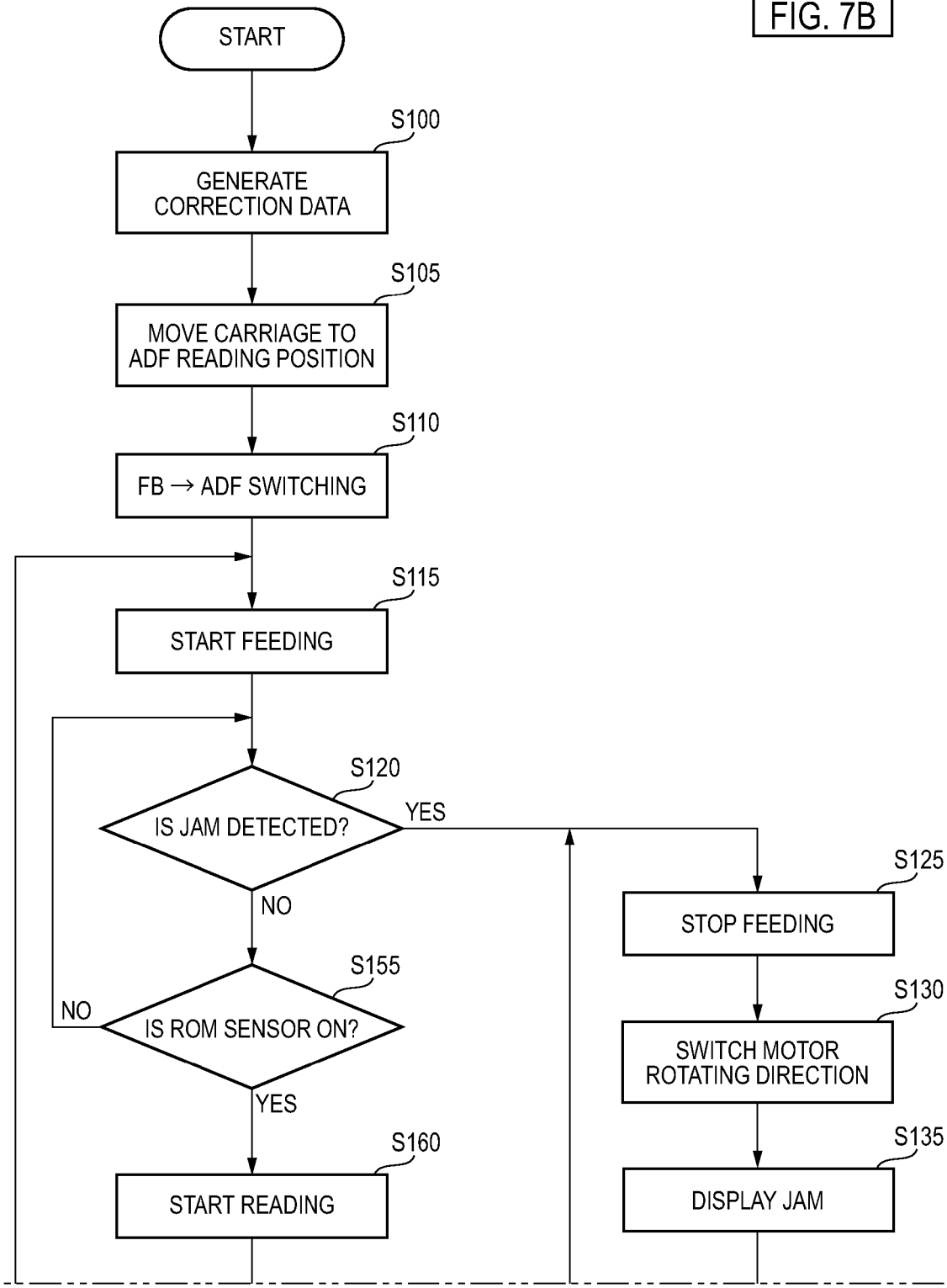

IMAGE READING APPARATUS

CROSS-REFERENCE TO RELATED APPLICATIONS

This application claims priority from Japanese Patent Application No. 2012-215649 filed on Sep. 28, 2012, the entire subject matter of which is incorporated herein by reference.

TECHNICAL FIELD

The invention relates to an image reading apparatus, and more specifically, to an image reading apparatus having a configuration of commonalizing a motor in a feeding reading of reading a document while feeding the document and in a moving reading of reading a document while moving a reading unit by a carriage.

BACKGROUND

There has been proposed an image reading apparatus having a configuration of commonalizing a motor in a feeding reading and in a moving reading. In this image reading apparatus, when a motor gear is rotated in a counterclockwise direction to move a scanner module (carriage) to an ADF reading position, a second planet gear is rotated in a clockwise direction along a circumference of a sun gear unit until it abuts on a stopper pin and a position thereof is then fixed. At this time, a first planet gear is meshed with a first ADF gear, and the first ADF gear is rotated in the clockwise direction.

SUMMARY

In the above-described related-art, however, when a jam occurs while feeding a document in an ADF reading (feeding reading) and a user intends to pull out the document in a direction along which the first ADF gear is rotated in the clockwise direction, the second planet gear is prevented from being further rotated in the clockwise direction along the circumference of the sun gear unit by the stopper pin. Thus, since the meshed state between the first ADF gear and the first planet gear is not released, a load due to an engagement between the first planet gear and the first ADF gear is applied, so that it may take effort to pull out the jammed document.

Therefore, illustrative aspects of the invention provide a technique for reducing a burden of a jam solving job in a configuration of commonalizing a motor in a feeding reading of reading a document while feeding the document and in a moving reading of reading a document while moving a reading unit by a carriage.

According to one illustrative aspect of the invention, there is provided an image reading apparatus comprising: a reading unit configured to read an image of a document; a feeding unit configured to feed the document; a carriage that holds the reading unit and is configured to move in a predetermined direction; a motor; a motor-side transmission gear configured to transmit power supplied from the motor; a feeding unit-side transmission gear configured to transmit the power to the feeding unit in a feeding reading of reading an image of the document, which is fed by the feeding unit, by using the reading unit; a carriage-side transmission gear configured to transmit the power to the carriage in a moving reading of reading an image of the document by using the reading unit while moving the carriage; a switching gear configured to be switched between: a feeding unit-side position coupling the motor-side transmission gear and the feeding unit-side transmission gear; and a carriage-side position coupling the motor-side transmission gear and the carriage-side transmission gear; a sensor configured to output a detection signal which is changed depending on whether a document being fed by the feeding unit; and a control device configured to perform: a determination process of determining whether the document being fed by the feeding unit has jammed, based on the detection signal output from the sensor; and a driving process of, when it is determined that the jam has occurred, driving the motor in a direction of releasing a meshed state between the feeding unit-side transmission gear and the switching gear.

According to the above configuration, the motor is driven in a direction of releasing a meshed state between the feeding unit-side transmission gear and the switching gear. Thus, a meshed amount between the feeding unit-side transmission gear and the switching gear is reduced. Therefore, it is possible to reduce a burden of a jam solving job in a configuration of commonalizing a motor in a feeding reading of reading a document while feeding the document and in a moving reading of reading a document while moving a reading unit by a carriage.

According to the illustrative aspects of the invention, it is possible to reduce a burden of a jam solving job in the configuration of commonalizing the motor in the feeding reading of reading a document while feeding the document and in the moving reading of reading a document while moving the reading unit by a carriage.

BRIEF DESCRIPTION OF THE DRAWINGS

FIGS. 7A and 7B are flowcharts showing document reading process that is performed when reading a document.

DETAILED DESCRIPTION

Exemplary Embodiment

In the below, one exemplary embodiment will be described with reference to FIGS. 1 to 7.

1. External Configuration of Multi-Function Device

Figure 1:
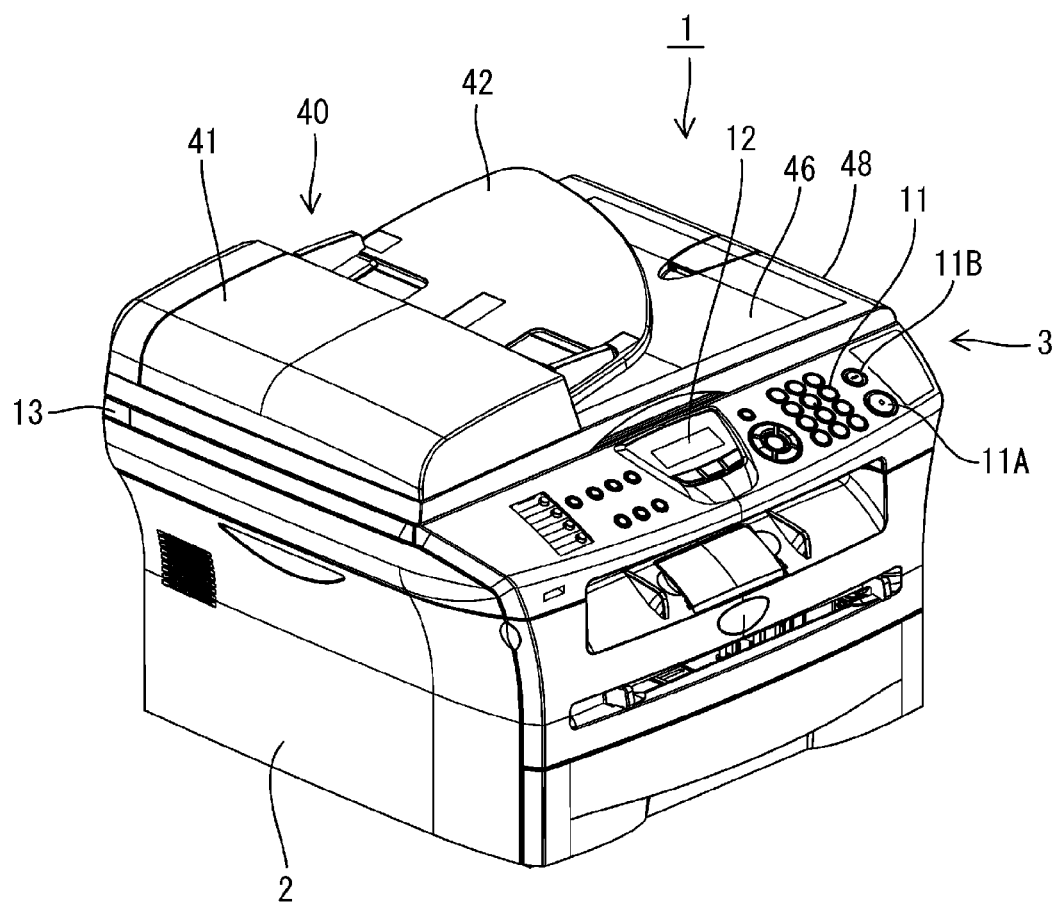
FIG. 1 is a perspective view showing an appearance of a multi-function device according to an exemplary embodiment.

A multi-function device 1 shown in FIG. 1 is a multi-functional peripheral apparatus having printer, scanner (document reading), copying, facsimile functions and the like. The multi-function device 1 is an example of an image reading apparatus.

Figure 2:
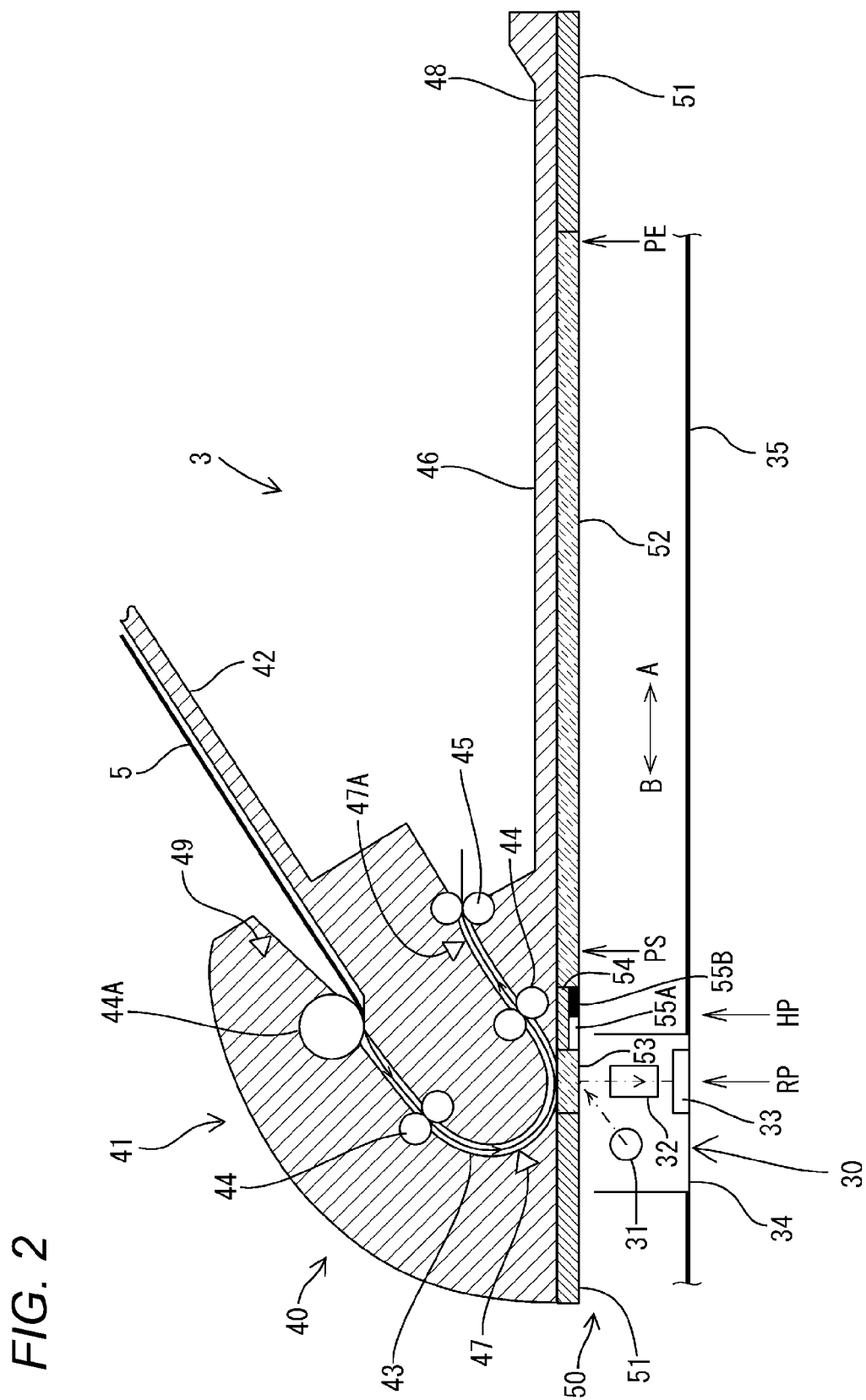
FIG. 2 is a schematic sectional view of an image reading device of the multi-function device.

As shown in FIG. 1, the multi-function device 1 includes an image reading device 3 configured to read a document. The image reading device 3 is provided at the upper of a main body part 2 of the multi-function device 1. As shown in FIG. 2, the image reading device 3 includes a reading unit 30, a carriage 34, an automatic document feeder (ADF) device 40, a document setting unit 50, a reading driving unit 60 (refer to FIG. 6) and the like. As an image reading method, the image reading device 3 has: a moving reading (hereinafter, referred to as 'FB (flat bed) reading') of reading an image of a document while moving the carriage 34; and a feeding reading (hereinafter, referred to as 'ADF reading') of reading an image of a document being fed by feeding units 44, 44A, 45 (refer to FIG. 2). Incidentally, the image reading device is not limited to a part of the multi-function device 1. For example, the image reading device may be embodied in a stand-alone scanner apparatus or copier.

As shown in FIG. 2, the document setting unit 50 includes an underframe 51, a first platen glass 52 made of a transparent glass plate, a second platen glass 53 and an intermediate frame 54 that is arranged at the intermediate of the glasses 52, 53. An upper surface of the first platen glass 52 is covered by a rotatable document cover 48.

The intermediate frame 54 is provided with a mark 55 (which is an example of the detection member) for detecting a home position HP. The mark 55 includes a white tape 55A and a black tape 55B aligned in a sub-scanning direction (arrow A in FIG. 2). A position at which data read by the reading unit 30 is changed from black to white (or from white to black) is detected as the home position HP. Here, the home position HP may become a standby position by which the reading unit 30 stands when the reading unit 30 does not perform an image reading process of reading an image of a document 5 set on the first platen glass. Further, the home position may become a reference position of moving control of the carriage 34 when performing an FB reading operation.

That is, when the FB reading starts and a driving amount (the number of driving steps, in this exemplary embodiment) of driving the motor 62 after the home position HP is detected by the reading unit 30 reaches a predetermined driving amount, the reading unit 30 starts a reading scanning of the document 5 on the first platen glass 52. In other words, when the motor 62 is driven by a predetermined number of FB reading starting steps and thus the reading unit 30 reaches a reading starting position PS shown in FIG. 2 from the home position HP, the reading unit 30 starts a reading scanning of the document 5. Also, when the motor 62 is driven by a predetermined number of FB reading ending steps and thus the reading unit 30 reaches a reading ending position PE shown in FIG. 2 from the home position HP, the reading unit 30 ends the reading scanning of the document 5. Like this, the home position HP is a reference position when the reading unit 30 performs the reading scanning. Therefore, the detection process of the home position HP is performed as an example of the initialization process of the reading unit 30.

The document cover 48 is connected to a rear-upper side (a side at which an operation unit 11, a display unit 12 and the like are provided is a front side) of the main body part 2 of the multi-function device 1 so that it can be rotated between a close posture, at which the first platen glass 52 is closed, and an open posture at which the first platen glass 52 is opened. The ADF device 40 is provided on the document cover 48. A cover sensor 13 configured to detect an open/close state of the document cover 48 is provided to the upper of the main body part 2 (refer to FIG. 1).

As shown in FIG. 2, the ADF device 40 includes an ADF cover 41, a document tray (sheet feeding tray) 42, a feeding path 43, a variety of rollers such as feeding rollers 44, a feeder roller 44A, sheet discharge rollers 45 and the like, and a sheet discharge tray 46 using an upper surface of the document cover 48. The ADF device 40 is configured to feed documents 5, which are set on the document tray 42, one at a time, and to convey the document to pass on the second platen glass 53 and to discharge the document onto the sheet discharge tray 46. Further, the ADF device 40 includes: a rear sensor 47 (which is an example of a sensor) such as photo sensor for detecting the document 5 fed by the feeding rollers 44; and a front sensor 49 such as photo sensor for detecting the document 5 that is set on the document tray 42. Here, the feeding rollers 44, the feeder roller 44A and the sheet discharge rollers 45 are one example of the feeding unit feeding the document 5.

As shown in FIG. 2, the reading unit 30 is provided below the document setting unit 50. Here, the reading unit 30 is configured to read a document by a CIS (Contact Image Sensor) type. The reading unit 30 includes: a linear image sensor 33 having a plurality of light receiving elements vertically aligned in a linear shape with respect to a drawing sheet; a light source 31 having light emitting diodes of three colors (RGB) and the like; and a rod lens array 32 imaging reflected light, which is reflected on the document 5 and the like, on the respective light receiving elements of the linear image sensor 33. The carriage 34, which holds the reading unit 30, is coupled to a timing belt 35 and is configured to move in arrow A and B directions as the timing belt 35 moves. The timing belt 35 is driven by the reading driving unit 60 (which will be described later) through a sprocket and the like (not shown). Incidentally, the reading unit 30 is not limited to the CIS type and may be a so-called CCD type using a reduction optical system and CCD (charge-coupled device) image sensor.

When reading the document 5 set on the first platen glass 52, e.g., when performing the FB reading, the reading unit 30 reads the document 5 with being fed from the home position HP in a direction (the A direction in FIG. 2) parallel with a platen surface of the first platen glass 52 at constant speed by the carriage 34 coupled to the timing belt 35. At this time, a reading range in the feeding direction is from the reading starting position PS to the reading ending position PE shown in FIG. 2, for example.

On the other hand, when reading the document 5 that is fed by the ADF device 40, e.g., when performing the ADF reading, the reading unit 30 reads the document 5 with being held at an ADF reading position RP just below the second platen glass 53 by the carriage 34.

Further, in this exemplary embodiment, as described later, when the carriage 34 is located at the ADF reading position RP, the planet gear 74C is switched between a carriage-side position (hereinafter, referred to as 'FB-side position') and a feeding unit-side position (hereinafter, referred to as 'ADF-side position').

The multi-function device 1 is provided on its front side with an operation unit 11 having various buttons and a display unit 12 configured by a liquid crystal display, for example. The operation unit 11 includes a start button 11A for starting a reading operation and a power supply switch 11B for turning on/off power feeding to the multi-function device 1.

Incidentally, in this exemplary embodiment, when mentioning a position of the carriage 34 or position of the reading unit 30, it means a position of a linear image sensor 33 of the reading unit 30. For example, when mentioning that the carriage 34 and the reading unit 30 are located at the ADF reading position RP, it means that the linear image sensor 33 is located at a position facing the second platen glass 53, as shown in FIG. 2. Also, when mentioning that the carriage 34 and the reading unit 30 are located at the home position HP, it means that the linear image sensor 33 is located at a position facing the intermediate frame 54, e.g., a position facing the mark 55 for home position HP detection.

2. Configuration of Reading Driving Unit

In the below, the reading driving unit 60 will be described with reference to FIGS. 3 to 6. The reading driving unit 60 includes a motor driving unit 61, a motor 62 and a gear unit 70.

Figure 3:
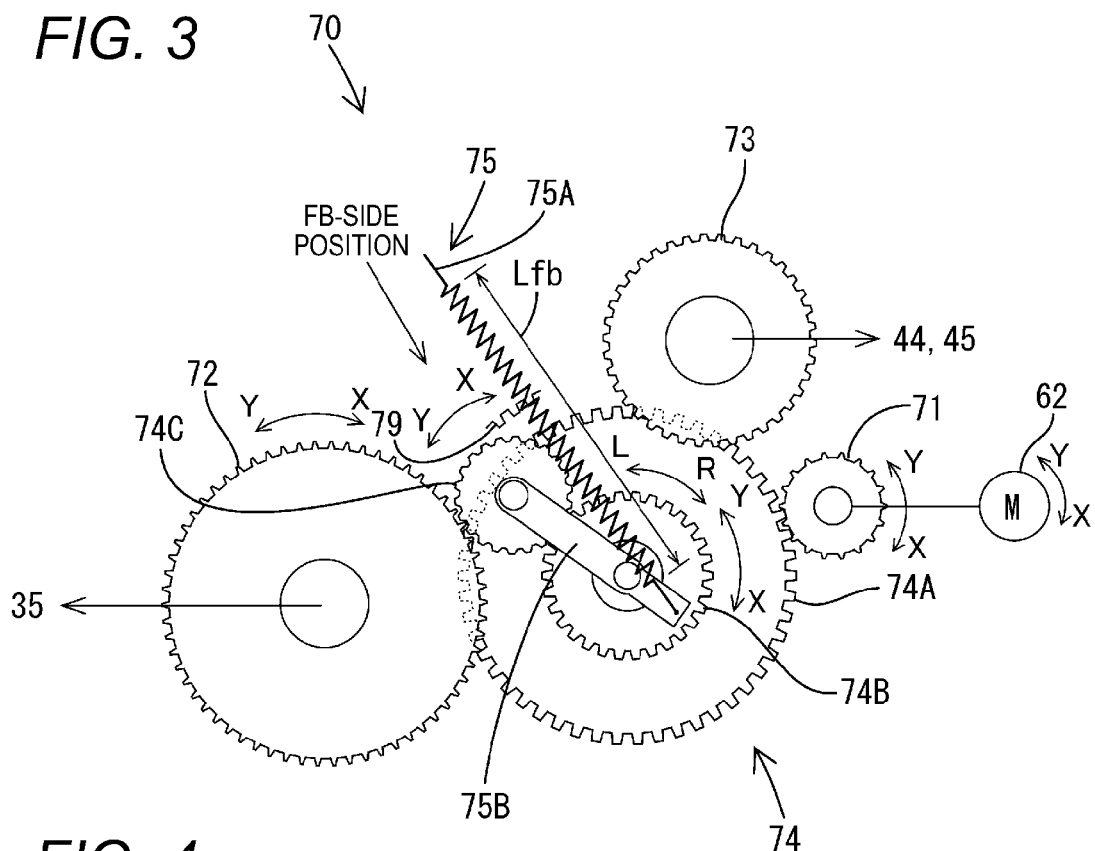
FIG. 3 illustrates a case where a planet gear is located at an FB-side position.
Figure 4:
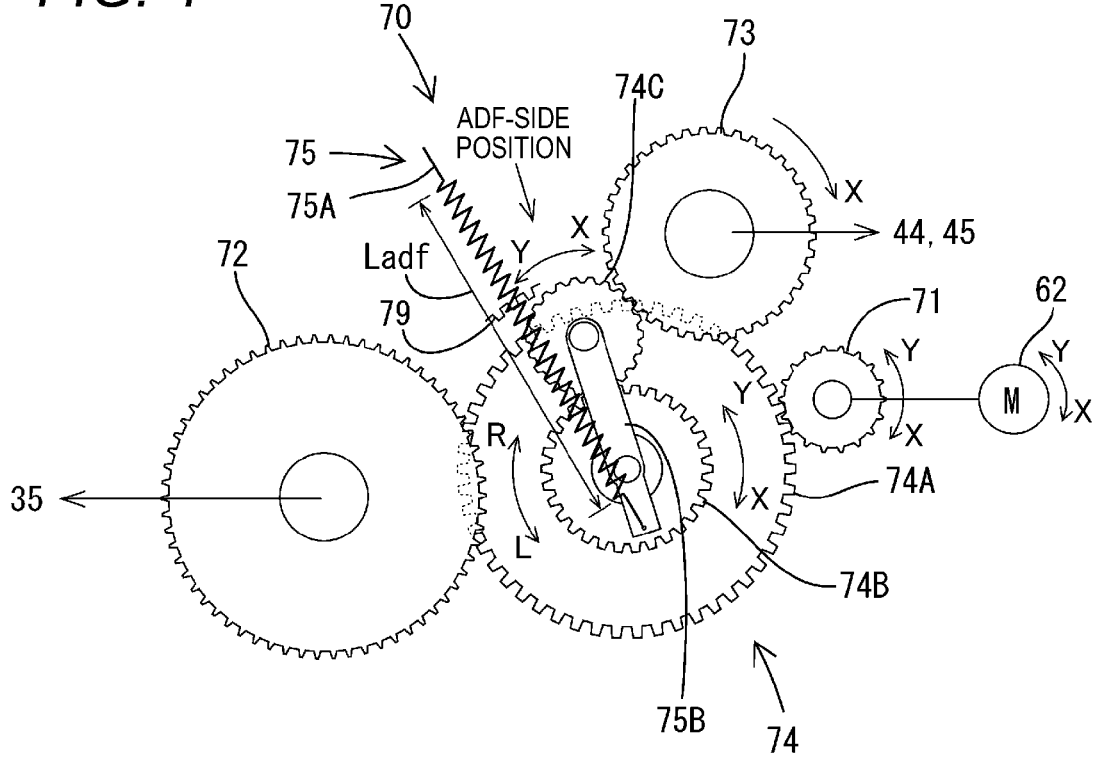
FIG. 4 illustrates a case where the planet gear is located at an ADF-side position.
Figure 5:
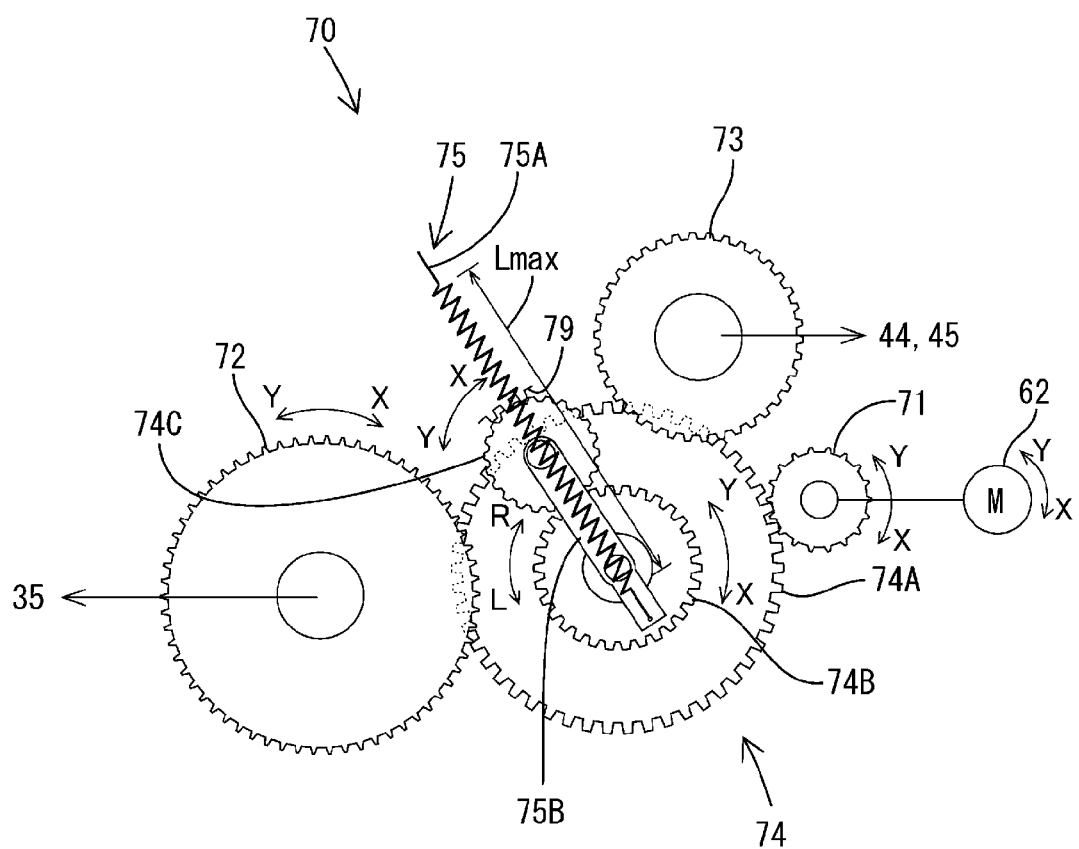
FIG. 5 illustrates a case where the planet gear is located at an intermediate position between the FB-side position and the ADF-side position.

The motor 62 is a stepping motor. The motor driving unit 61 is configured to generate a driving signal for stepwise driving the motor 62 under control of a CPU 20 (which will be described later). The gear unit 70 includes a motor-side transmission gear 71, a carriage-side transmission gear (hereinafter, referred to as 'FB-side transmission gear') 72, a feeding unit-side transmission gear (hereinafter, referred to as 'ADF-side transmission gear') 73, a planet gear mechanism 74, a prevention mechanism 75 and a path 79 having internal teeth, as shown in FIGS. 3 to 5. The planet gear mechanism 74 includes a transmission gear 74A, a sun gear 74B and a planet gear (which is an example of the switching gear) 74C.

The motor-side transmission gear 71 is connected to a rotary shaft of the motor 62 and meshed with the transmission gear 74A of the planet gear mechanism 74. Therefore, as the motor 62 is rotated, the motor-side transmission gear 71 transmits power, which is supplied from the motor 62, to the transmission gear 74A. The sun gear 74B and the transmission gear 74A are coaxially fixed. As the transmission gear 74A is rotated, e.g., as the motor-side transmission gear 71 is rotated, the sun gear 74B is rotated.

The planet gear 74C is meshed with the sun gear 74B. As the sun gear 74B is rotated, the planet gear 74C rotates on its own axis and revolves around the sun gear. A position of the planet gear 74C is switched between an FB-side position, at which the planet gear 74C is meshed with the FB-side transmission gear 72 to thus couple the motor-side transmission gear 71 and the FB-side transmission gear 72 via the transmission gear 74A and the sun gear 74B, and an ADF-side position, at which the planet gear 74C is meshed with the ADF-side transmission gear 73 to thus couple the motor-side transmission gear 71 and the ADF-side transmission gear 73 via the transmission gear 74A and the sun gear 74B. FIG. 3 shows a state where the planet gear 74C is located at the FB-side position, and FIG. 4 shows a state where the planet gear 74C is located at the ADF-side position. Further, FIG. 5 illustrates a case where the planet gear 74C is located at a substantially intermediate position between the FB-side position and the ADF-side position.

As shown in FIGS. 3 to 5, the prevention mechanism 75 includes a spring (which is an example of the urging member) 75A and a support member 75B, for example. One end of the spring 75A is fixed to one end of the support member 75B, and the other end of the spring 75A is fixed to a frame unit (not shown) of the reading image device 3, for example. The support member 75B is fitted to a rotary shaft of the sun gear 74B and a rotary shaft of the planet gear 74C so as to hold a meshed state between the sun gear 74B and the planet gear 74C but is also fitted so that the respective rotary shafts can be freely rotated. Therefore, the sun gear 74B and the planet gear 74C, which are fixed to the respective rotary shafts, can be rotated while the meshed state thereof being maintained by the support member 75B. Further, the planet gear 74C can revolve around the sun gear with the meshed state to the sun gear 74B being maintained by the support member 75B. Incidentally, the urging member is not limited to the spring 75A and the other elastic member such as rubber may be also possible.

The spring 75 A is fixed with being stretched. Thereby, when the rotary shaft of the planet gear 74C is located at a position in an L direction from the spring 75A (refer to FIG. 3), a moment having the rotary shaft of the sun gear 74B as a fulcrum is applied in a direction of revolving the planet gear 74C in the L direction through the support member 75B by a contracting force of the spring 75A. Further, when the rotary shaft of the planet gear 74C is located at a position in an R direction from the spring 75A (refer to FIG. 4), the moment is applied in a direction of revolving the planet gear 74C in the R direction through the support member 75B.

Incidentally, when the rotary shaft of the planet gear 74C is located just below the spring 75A, a shaft direction of the spring 75A substantially overlaps with a length direction of the support member 75B, as shown in FIG. 5. Therefore, the contracting force of the spring 75A is not applied in the revolving direction of the planet gear 74C, so that it doesn't have an influence on the revolution of the planet gear 74C. Also, when the rotary shaft of the planet gear 74C is located just below the spring 75A, a length of the spring 75A is Lmax at which the spring is most stretched. Incidentally, a length Lfb of the spring 75A when the planet gear 74C is located at the FB-side position (refer to FIG. 3) and a length Ladf of the spring 75A when the planet gear 74C is located at the ADF-side position (refer to FIG. 4) are shorter than the length Lmax.

That is, when the planet gear 74C is located at the FB-side position, the prevention mechanism 75 is configured to urge the planet gear 74C at a state where the spring 75A is less stretched, compared to a case where the planet gear 74C is located between the FB-side position and the ADF-side position.

Further, with the above configuration, when performing the moving reading, the spring 75A urges the planet gear 74C located at the FB-side position in a direction of pressing the planet gear 74C to the FB-side transmission gear 72, and when performing the feeding reading, the spring 75A urges the planet gear 74C located at the ADF-side position in a direction of pressing the planet gear 74C to the ADF-side transmission gear 73.

In this case, when the planet gear 74C is located at the FB-side position, it is possible to strengthen the meshing between the planet gear 74C and the FB-side transmission gear 72 by the spring 75A, so that it is possible to appropriately perform the moving reading. Incidentally, with the spring 75A, even when performing the feeding reading, the meshing between the planet gear 74C and the ADF-side transmission gear 73 may also be strengthened as the meshing between the planet gear 74C and the FB-side transmission gear 72 is strengthened. However, a driving process that will be described later is performed, so that it is possible to weaken the meshing between the planet gear 74C and the ADF-side transmission gear 73 upon occurrence of a jam. Therefore, even with the above configuration, it is possible to reduce a burden of a jam solving job.

In the below, the operations of the reading driving unit 60 will be more specifically described. Incidentally, in FIGS. 3 to 5, a rotating direction of the X direction is referred to as a rotating direction of a clockwise direction, and a rotating direction of the Y direction is referred to as a rotating direction of a counterclockwise direction. Further, it is assumed that the motor-side transmission gear 71 is rotated in the X direction as the motor 62 is rotated in the X direction, and the motor-side transmission gear 71 is rotated in the Y direction as the motor 62 is rotated in the Y direction.

2-1. Rotation of Motor and Rotations of Respective Gears

For example, as shown in FIG. 5, it is assumed that the planet gear 74C is not meshed with both the FB-side transmission gear 72 and the ADF-side transmission gear 73. When the motor 62 is rotated in the X direction, the motor-side transmission gear 71 is rotated in the X direction, so that the transmission gear 74A and the sun gear 74B are rotated in the Y direction. As the sun gear 74B is rotated in the Y direction, the planet gear 74C rotates on its own axis in the X direction and revolves around the sun gear in the L direction. Then, as shown in FIG. 3, when the planet gear 74C is meshed with the FB-side transmission gear 72 and reaches the FB-side position, the planet gear 74C further rotates on its own axis in the X direction but is prevented from revolving around the sun gear in the L direction by the FB-side transmission gear 72. At this time, the FB-side transmission gear 72 is rotated in the Y direction, so that the timing belt 35 is moved in the A direction of FIG. 2, e.g., a direction of moving the carriage 34 from the reading starting position PS to the reading ending position PE.

On the other hand, the motor 62 is rotated in the Y direction, so that the motor-side transmission gear 71 is rotated in the Y direction. Accompanied by this, the transmission gear 74A and the sun gear 74B are rotated in the X direction. As the sun gear 74B is rotated in the X direction, the planet gear 74C rotates on its own axis in the Y direction but is prevented from revolving around the sun gear in the R direction because it is pressed in the L direction of pressing the FB-side transmission gear 72 by the prevention mechanism 75. At this time, the FB-side transmission gear 72 is rotated in the X direction, so that the timing belt 35 is moved in the B direction of FIG. 2, e.g., a direction of moving the carriage 34 from the reading ending position PE to the reading starting position PS. Like this, when the planet gear 74C is located at the FB-side position, the planet gear 74C is pressed in the direction of strengthening the meshing between the planet gear 74C and the FB-side transmission gear 72 by the prevention mechanism 75, so that it is possible to appropriately move the carriage 34 in the B direction of FIG. 2.

The, when the carriage 34 moved in the B direction of FIG. 2 reaches the ADF reading position RP, the carriage 34 abuts on the frame unit (not shown) of the image reading device 3, so that the FB-side transmission gear 72 is unable to be rotated any more. When a force higher than the force of preventing the planet gear 74C from revolving in the R direction by the prevention mechanism 75 is transmitted from the motor 62, the planet gear 74C kicks the FB-side transmission gear 72 and thus slightly revolves around the sun gear in the R direction, so that the planet gear 74C is meshed with the internal teeth of the path 79. Thereby, the revolution prevention of the planet gear 74C in the R direction by the prevention mechanism 75 is released, and the planet gear 74C revolves around the sun gear in the R direction while rotating on its own axis in the Y direction. At this time, as described above, since the force higher than the force of preventing the revolution by the prevention mechanism 75 is transmitted from the motor 62, the planet gear 74C revolves around the sun gear in the R direction as the sun gear 74B is rotated.

Then, as shown in FIG. 4, when the planet gear 74C is meshed with the ADF-side transmission gear 73 to thus reach the ADF-side position, the planet gear 74C further rotates on its own axis in the Y direction but is prevented from revolving around the sun gear in the R direction by the ADF-side transmission gear 73. At this time, as the planet gear 74C rotates on its own axis in the Y direction, the ADF-side transmission gear 73 is rotated in the X direction. As the ADF-side transmission gear 73 is rotated in the X direction, the feeding rollers 44, the feeder roller 44A and the sheet discharge rollers 45 are rotated in a direction of feeding the document 5 from the document tray 42 to the sheet discharge tray 46. Incidentally, as described above, even when the planet gear 74C is located at the ADF-side position, the planet gear 74C is pressed in the R direction of pressing the ADF-side transmission gear 73 by the prevention mechanism 75.

On the other hand, when the motor 62 is rotated in the X direction at a state where the planet gear 74C is located at the ADF-side position, the motor-side transmission gear 71 is rotated in the X direction, so that the transmission gear 74A and the sun gear 74B are correspondingly rotated in the Y direction. The ADF-side transmission gear 73 is rotated only in the X direction and is not rotated in the Y direction. Therefore, when a force higher than the force of preventing the planet gear 74C from revolving in the L direction by the prevention mechanism 75 is transmitted from the motor 62, the planet gear 74C kicks the ADF-side transmission gear 73 and thus slightly revolves around the sun gear in the L direction, so that the planet gear 74C is meshed with the internal teeth of the path 79. Thereby, as the sun gear 74B is rotated in the Y direction, the revolution prevention of the planet gear 74C in the L direction is released, and the planet gear 74C revolves around the sun gear in the L direction while rotating on its own axis in the X direction.

2-2. Operations of Respective Gears Relating to ADF Reading

In the ADF reading, as described above, when the motor 62 is continuously rotated in the X direction even after the planet gear 74C is meshed with the ADF-side transmission gear 73, the ADF-side transmission gear 73 is rotated in the X direction, and the feeding rollers 44 and the sheet discharge rollers 45 are rotated in the direction of feeding the document 5 from the document tray 42 to the sheet discharge tray 46, as shown in FIG. 4.

Further, when the motor 62 is rotated in the X direction after the ADF reading is completed, the planet gear 74C rotates on its own axis in the X direction and revolves around the sun gear in the L direction, as described above, and is separated from the meshed ADF-side transmission gear 73.

2-3. Operations of Respective Gears Relating to FB Reading

In the FB reading, as described above, when the motor 62 is continuously rotated in the X direction even after the planet gear 74C is meshed with the FB-side transmission gear 72, the FB-side transmission gear 72 is driven in the Y direction so that the timing belt 35 moves the carriage 34 in the A direction of FIG. 2.

Further, after the FB reading is completed, when the motor 62 is inversely rotated from the X direction to the Y direction, the planet gear 74C rotates on its own axis in the Y direction. However, as described above, the planet gear 74C rotates on its own axis in the Y direction without revolving around the sun gear in the R direction by the prevention mechanism 75, which prevents the planet gear 74C from revolving around the sun gear in the R direction along which the planet gear 74C is separated from the meshed FB-side transmission gear 72. At this time, the FB-side transmission gear 72 is inversely rotated in the X direction, so that the timing belt 35 is moved in the direction of moving the carriage 34 in the B direction of FIG. 2.

Then, when the carriage 34 reaches the ADF reading position RP, the rotation of the FB-side transmission gear 72 is stopped, and the planet gear 74C kicks the stopped FB-side transmission gear 72, as described above. Thereby, the planet gear 74C revolves around the sun gear in the R direction while rotating on its own axis in the Y direction and is separated from the meshed FB-side transmission gear 72.

3. Electrical Configuration of Multi-Function Device

Figure 6:
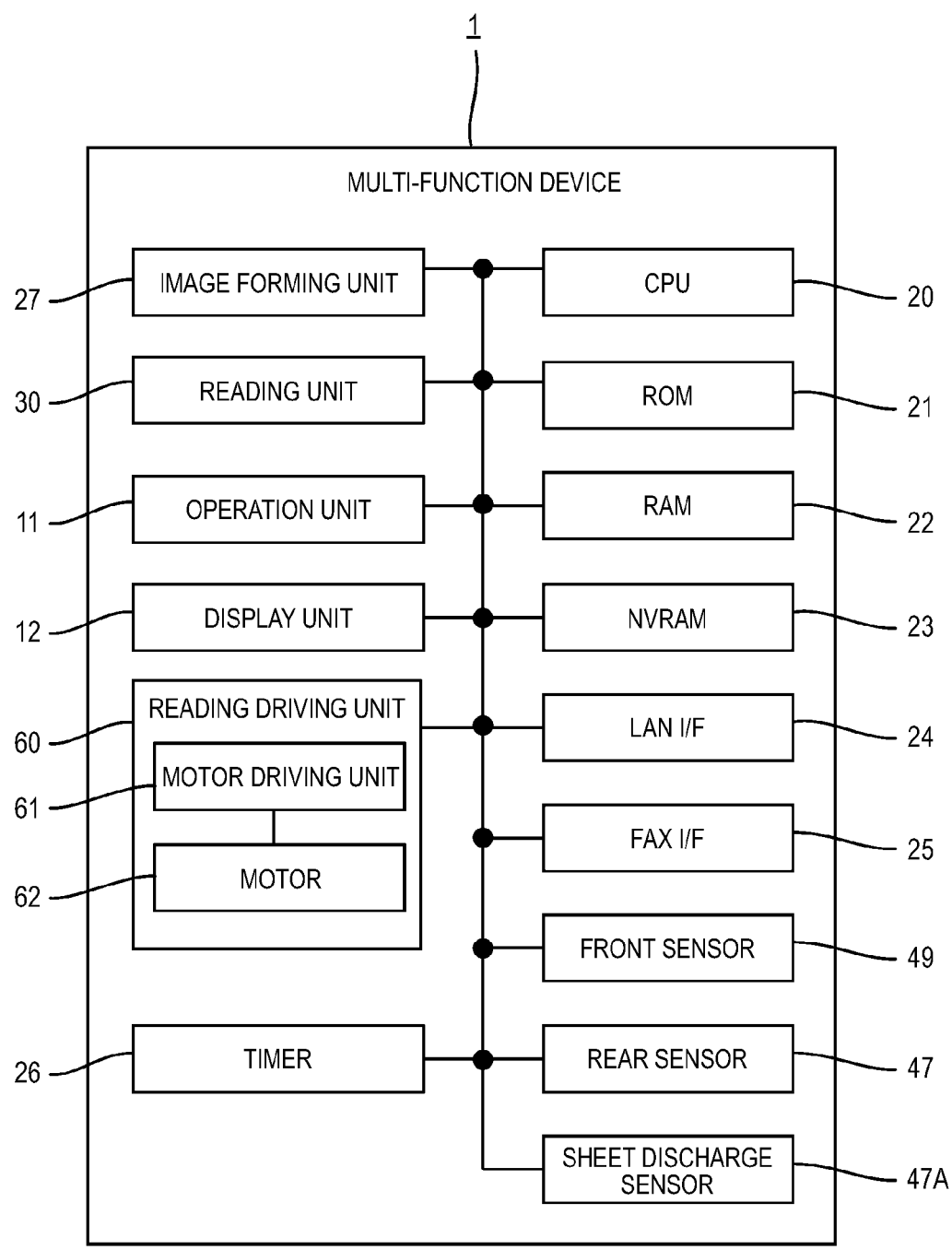
FIG. 6 is a block diagram schematically showing an electrical configuration of the multi-function device.

As shown in FIG. 6, the multi-function device 1 includes a CPU 20 (which is an example of a control device), a ROM 21, a RAM 22, an NVRAM (non-volatile memory) 23, a network interface (which is an example of the reception unit) 24, a facsimile interface 25 and a timer 26. An image forming unit 27, the reading unit 30, the operation unit 11, the display unit 12, the rear sensor 47, a sheet discharge sensor 47A, the front sensor 49, the reading driving unit 60 and the like are connected thereto.

The ROM 21 is configured to store a variety of programs for controlling operations of the multi-function device 1. The CPU 20 is configured to store a processing result in the RAM 22 or NVRAM 23 and to control the respective units in response to the program read from the ROM 21.

The network interface 24 is connected to an external computer and the like via a communication line (not shown). Data communication can be performed through the network interface 24. Incidentally, it is also possible to receive a reading starting instruction from the external computer through the network interface 24.

The facsimile interface 25 is connected to a telephone line (not shown). Facsimile data communication with an external facsimile apparatus and the like can be performed through the facsimile interface 25. The image forming unit 27 includes a charging unit, an exposure unit, a photosensitive member, a developing unit, a transfer unit and a fixing unit, which are well-known, and is configured to form an image on a sheet (which is an example of recording medium), based on image data of an image (document) read by the image reading device 3. Further, the timer 26 is configured to measure a variety of times relating to the image formation.

The CPU 20 is configured to control a variety of processing relating to the multi-function device 1. The CPU 20 is configured to perform a determination process and a driving process as the processing relating to the image reading device 3. In the determination process, it is determined whether the document 5, which is fed by the feeding units 44, 44A, 45, has jammed, based on a detection signal output from the rear sensor 47. When it is determined that the jam has occurred, the CPU 20 performs the driving process of driving the motor 62 in a direction of releasing the meshed state between the ADF-side transmission gear 73 and the planet gear 74C.

4. Document Reading Process

Subsequently, document reading process of this exemplary embodiment will be described with reference to FIG. 7. For example, when a copying function of the multi-function device 1 is selected, the document 5 is set on the document tray 42, the document 5 is detected by the front sensor 49 and the start switch 11A is pushed by a user, the document reading process is performed. The respective process relating to the document reading process is performed by the CPU 20 in response to a predetermined control program stored in the ROM 21 and the like.

Figure 7B:
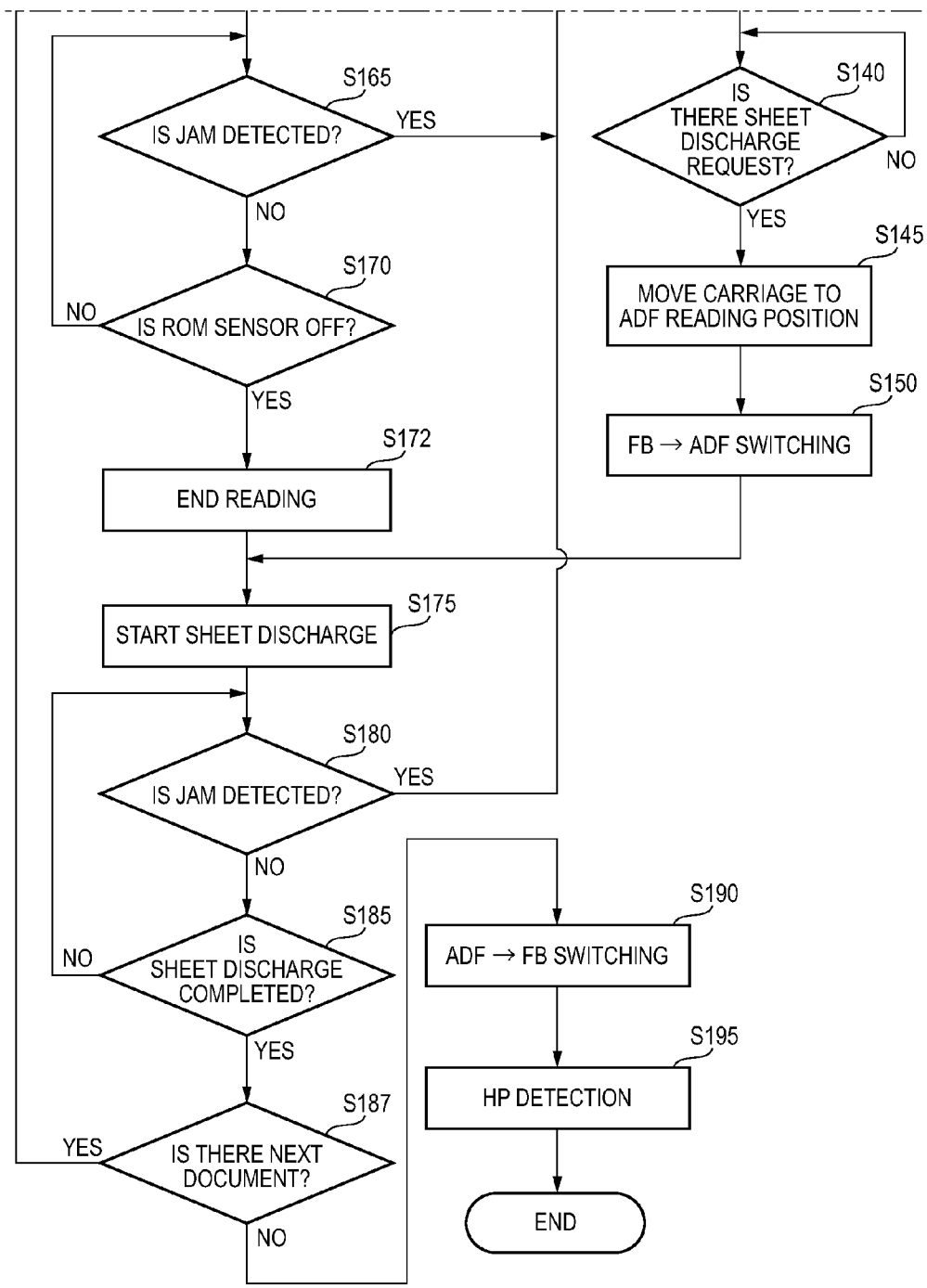

In the document reading process, as shown in FIG. 7, the CPU 20 first generates correction data for correcting image data of a document, which is generated by reading an image of the document with the reading unit 30, and stores the generated correction data in the RAM 22, for example (step S100). The correction data includes well-known shading correction data and the like. The correction data is generated based on the moving of the carriage 34 to the home position HP and illumination of light to a white tape 55A with the reading unit 30 and reflected light from the white tape 55A, for example.

Then, the CPU 20 rotates the motor 62 in the Y direction to thus move the carriage 34 to the ADF reading position RP (step S105) and further rotates the motor 62 in the Y direction to thus switch the planet gear 74C from the FB-side position to the ADF-side position (step S110).

Then, the CPU 20 further rotates the motor 62 in the Y direction to thus drive the feeder roller 44A and the feeding rollers 44, thereby starting to feed the document 5 (step S115).

Then, the CPU 20 determines whether a jam is detected during the feeding of the document 5 to the rear sensor 47 (step S120: which is an example of the determination process). This determination is made by measuring elapsed time K1 with the timer 26, during which the rear sensor 47 continues to be OFF from the driving start of the feeder roller 44A, and determining whether the elapsed time K1 reaches jam determining time Jk1, for example. At this time, the jam determining time Jk1 is set to be longer than predetermined time Kth1 from the driving start of the feeder roller 44A until a leading end of the document 5 is detected by the rear sensor 47. That is, when the document 5 does not reach the rear sensor 47 until the predetermined time Kth1, it can be determined that the jam has occurred between the document tray 42 and the rear sensor 47.

Incidentally, the jam detection method is not limited to the above. For example, the jam may be detected by determining whether the number of driving steps of the motor 62 from the driving start of the feeder roller 44A until the rear sensor 47 continues to be OFF reaches the number of jam determining steps. At this time, the number of jam determining steps may be set to be larger than the number of predetermined steps from the driving start of the feeder roller 44A until the leading end of the document 5 is detected by the rear sensor 47.

When the jam is detected, e.g., when it is determined that the elapsed time K1 reaches the jam determining time Jk1 (step S120: YES), the CPU 20 stops the motor 62 to thereby stop the feeding of the document 5 (step S125). Then, the CPU 20 changes the rotating direction of the motor 62 in the direction of releasing the meshed state between the ADF-side transmission gear 73 and the planet gear 74C and drives the motor 62 (step S130: which is an example of the driving process). Incidentally, specifically, the CPU 20 changes the rotating direction of the motor 62 from the Y direction to the X direction to thus drive the motor 62, switches the planet gear 74C from the ADF-side position to the FB-side position and positions the carriages 34 at the home position HP.

That is, in this exemplary embodiment, as described above, when the planet gear 74C is located at the FB-side position, the spring 75A urges the planet gear 74C at a state where the spring 75A is less stretched, compared to a case where the planet gear 74C is located between the FB-side position and the ADF-side position. In this configuration, when a jam is detected, the CPU 20 drives the motor 62 until the FB-side transmission gear 72 and the planet gear 74C are meshed with each other, in switching the planet gear 74C from the ADF-side position to the FB-side position. In this case, compared to a configuration where the driving of the motor 62 is stopped at an intermediate position at which the planet gear 74C is not meshed with both the ADF-side transmission gear 73 and the FB-side transmission gear 72, it is possible to more reduce the stretched amount of the spring 75A, thereby prolonging the lifetime of the spring 75A.

Then, the CPU 20 displays the information relating to the occurrence of the jam on the display unit 12, for example, thereby notifying the user of the occurrence of the jam (step S135: which is an example of the notification process). Like this, the jam is notified after performing the driving process of removing the jam. Thereby, compared to a configuration where the jam is notified before the driving process is performed, it is possible to reduce the jam solving job that is performed during the release of the meshed state between the ADF-side transmission gear 73 and the planet gear 74C.

Then, the CPU 20 receives a sheet discharge request, as a jam solving command, through the operation unit 11 and determines whether there is a sheet discharge request (step S140: which is an example of the reception process). When it is determined that there is a sheet discharge request, e.g., when a jam solving command is received (step S140: YES), the CPU 20 drives the motor 62 in the direction of meshing the ADF-side transmission gear 73 and the planet gear 74C. Here, specifically, the motor 62 is rotated in the Y direction to thus move the carriage 34 from the home position HP to the ADF reading position RP (step S145), and then the motor 62 is further rotated in the Y direction to thereby switch the planet gear 74C from the FB-side position to the ADF-side position (step S150). Then, the CPU 20 further rotates the motor 62 in the Y direction to thus drive the feeding rollers 44 and the sheet discharge rollers 45, thereby starting to discharge the jammed document 5 (step S175).

That is, when the CPU 20 receives the sheet discharge request (which is an example of the solving command) after the driving process starts, the CPU 20 drives the motor 62 in the Y direction of meshing the ADF-side transmission gear 73 and the planet gear 74C. Therefore, it is possible to approximate the planet gear 74C to a state before the jam has occurred.

Further, after the ADF-side transmission gear 73 and the planet gear 74C are meshed, the CPU 20 drives the motor 62 in the Y direction of further discharging the document 5. Therefore, even when the document 5 remains after the user performs the jam solving job, it is possible to discharge the document 5 to the outside of the image reading device 3.

On the other hand, back to step S120, when a jam is not detected, e.g., when it is determined that the elapsed time K does not reach the jam determining time Jk1 yet (step S120: YES), the CPU 20 determines whether the rear sensor 47 receives a detection signal indicating the detection of the leading end of the document 5, e.g., an on signal (step S155). When it is determined that the on signal is not received yet (step S155: NO), the CPU 20 returns to step S120 and determines whether a jam has occurred.

On the other hand, when it is determined that the on signal is received from the rear sensor 47 (step S155: YES), the CPU 20 determines that a jam has not occurred and starts to read the document 5 (step S160).

Then, the CPU 20 determines whether a jam is detected during the reading of the document 5 (step S165: which is an example of the determination process). This determination is made by measuring elapsed time K2 with the timer 26, during which the rear sensor 47 continues to be ON after the leading end of the document 5 is detected by the rear sensor 47, and determining whether the elapsed time K2 reaches jam determining time Jk2, for example. At this time, the jam determining time Jk2 is set to be longer than predetermined time Kth2 from the time at which the leading end of the document 5 is detected by the rear sensor 47 until a rear end of the document 5 is detected by the rear sensor 47. That is, when the rear end of the document 5 does not reach the rear sensor 47 within the predetermined time Kth2, it can be determined that the jam has occurred during the reading of the document 5.

When the jam is detected, e.g., when it is determined that the elapsed time K2 reaches the jam determining time Jk2 (step S165: YES), the CPU 20 performs the process from step S125 to step S150.

On the other hand, when a jam is not detected, e.g., when it is determined that the elapsed time K2 does not reach the jam determining time Jk2 yet (step S165: NO), the CPU 20 determines whether the rear sensor 47 receives a detection signal indicating the detection of the rear end of the document 5, e.g., an off signal (step S170). When it is determined that an off signal is not received yet (step S170: NO), the CPU 20 returns to step S165 and determines whether a jam has occurred. On the other hand, when it is determined that an off signal is received from the rear sensor 47 (step S170: YES), the CPU 20 determines that a jam has not occurred during the reading of the document 5, ends the reading after time elapses during which the rear end of the document 5 deviates from the ADF reading position RP (step S172) and starts to discharge the document 5 (step S175).

Then, the CPU 20 determines whether a jam is detected during the discharge of the document 5 (step S180: which is an example of the determination process). This determination is made by measuring elapsed time K3 with the timer 26, during which the sheet discharge sensor 47A continues to be ON after the leading end of the document 5 is detected by the sheet discharge sensor 47A, and determining whether the elapsed time K3 reaches jam determining time Jk3, for example. At this time, the jam determining time Jk3 is set to be longer than predetermined time Kth3 from the time at which the leading end of the document 5 is detected by the sheet discharge sensor 47A until the rear end of the document 5 is detected by the sheet discharge sensor 47A. That is, when the rear end of the document 5 does not reach the sheet discharge sensor 47A within the predetermined time Kth3, it can be determined that the jam has occurred during the discharge of the document 5.

When the jam is detected, e.g., when it is determined that the elapsed time K3 reaches the jam determining time Jk3 (step S180: YES), the CPU 20 performs the process from step S125 to step S150.

On the other hand, when a jam is not detected, e.g., when it is determined that the elapsed time K3 does not reach the jam determining time Jk3 yet (step S180: NO), the CPU 20 determines whether the sheet discharge is completed, e.g., whether the sheet discharge sensor 47A receives a detection signal indicating the detection of the rear end of the document 5, e.g., an off signal (step S185). When it is determined that an off signal is not received yet (step S185: NO), the CPU 20 returns to step S180 and determines whether a jam has occurred. On the other hand, when it is determined that an off signal is received from the sheet discharge sensor 47A, the CPU 20 determines that the sheet discharge is completed without a jam during the discharge of the document 5 (step S185: YES).

Then, the CPU 20 determines whether there is a next document 5, based on a detection signal of the front sensor 49 (step S187). When it is determined that there is a next document 5 (step S187: YES), the CPU returns to the processing of step S115. On the other hand, when it is determined that there is no next document 5 (step S187: NO), the CPU 20 changes the rotating direction of the motor 62 from the Y direction to the X direction, switches the planet gear 74C from the ADF-side position to the FB-side position (step S190) and further rotates the motor 62 in the X direction to thus position the carriage 34 at the home position HP (step S195). Incidentally, the moving aspect of the carriage 34 when positioning the carriage 34 at the home position HP is arbitrary and is not limited to the above.

5. Advantages of Exemplary Embodiments

According to the above-described exemplary embodiment, when it is determined that a jam has occurred, the rotating direction of the motor 62 is changed from the Y direction to the X direction and is then driven and the planet gear 74C is switched from the ADF-side position to the FB-side position, as the driving process of driving the motor 62 in the direction of releasing the meshed state between the ADF-side transmission gear 73 and the planet gear 74C. In other words, when a jam has occurred, the motor 62 is driven in the direction of releasing the meshed state between the ADF-side transmission gear 73 and the planet gear 74C, so that the meshed amount between the ADF-side transmission gear 73 and the planet gear 74C is reduced. Thereby, it is possible to easily move the feeding rollers 44 and the like and to reduce the burden of the jam solving job. That is, it is possible to reduce the burden of the jam solving job in the configuration of commonalizing the motor 62 in the feeding reading of reading the document 5 while feeding the document 5 and in the moving reading of reading the document 5 while moving the reading unit 30 by the carriage 34.

Other Exemplary Embodiments

The invention is not limited to the exemplary embodiments that have been described with reference to the drawings. For example, following exemplary embodiments are also included in the technical scope of the invention.

(1) In the above-described exemplary embodiment, when it is determined that a jam has occurred, the planet gear 74C is switched from the ADF-side position to the FB-side position. However, the invention is not limited thereto. That is, when it is determined that a jam has occurred, it has only to perform the driving process of driving the motor 62 in the direction of releasing the meshed state between the ADF-side transmission gear 73 and the planet gear 74C.

As the above-described driving process, for example, the CPU 20 may drive the motor 62 until it reaches the position at which the ADF-side transmission gear 73 and the planet gear 74C are not contacted, as shown in FIG. 5. In this case, so long as the ADF-side transmission gear 73 and the planet gear 74C are not meshed, it is possible to reduce the burden of the jam solving job in the configuration of commonalizing the motor in the feeding reading and in the moving reading.

Alternatively, when it is determined that a jam has occurred, the motor 62 may be driven with the number of predetermined steps in the X direction until the carriage 34 reaches the reading start position PS of FIG. 2, as the driving process.

(2) In the above-described exemplary embodiment, when the planet gear 74C is switched from the ADF-side position to the FB-side position, the motor 62 is further rotated in the X direction to thus position the carriage 34 at the home position HP. However, the invention is not limited thereto. For example, when the planet gear 74C is switched from the ADF-side position to the FB-side position, the carriage 34 may be positioned at the ADF reading position RP. In this case, the processing of step S145 may be omitted.

Further, the CPU 20 may drive the motor 62 in the direction of discharging the document 5 and then stop the motor 62 with the planet gear 64C being located at the ADF-side position. That is, the processing of steps S190 and S195 after the processing of step S187 may be omitted. That is, after performing the jam solving process, there is a high possibility that the user will again read the document in the feeding reading. Therefore, in this case, by switching the planet gear 74C to the ADF-side position after performing the jam solving process, it is possible to omit the processing from step S100 to step S110, so that it is not necessary to perform the switching operation of the planet gear 74C. According thereto, it is possible to reduce the processing time of the re-reading.

(3) In the above-described exemplary embodiments, the planet gear 74C of the planet gear mechanism 74 is used as the switching gear. However, the invention is not limited thereto. For example, another well-known configuration that is switched between the FB-side position coupling the motor-side transmission gear 71 and the carriage-side transmission gear 72 and the ADF-side position coupling the motor-side transmission gear 71 and the feeding unit-side transmission gear 73 may be used as the switching gear.

(4) In the above-described exemplary embodiment, the CPU 20 has been exemplified as an example of the control device. However, the invention is not limited thereto. For example, the control device may be configured by a plurality of circuits including an ASIC or may consist of a CPU and the other individual circuit.

As discussed above, the invention can provide at lest following illustrative, non-limiting embodiments.

(1) An image reading apparatus may comprise: a reading unit configured to read an image of a document; a feeding unit configured to feed the document; a carriage that holds the reading unit and is configured to move in a predetermined direction; a motor; a motor-side transmission gear configured to transmit power supplied from the motor; a feeding unit-side transmission gear configured to transmit the power to the feeding unit in a feeding reading of reading an image of the document, which is fed by the feeding unit, by using the reading unit; a carriage-side transmission gear configured to transmit the power to the carriage in a moving reading of reading an image of the document by using the reading unit while moving the carriage; a switching gear configured to be switched between: a feeding unit-side position coupling the motor-side transmission gear and the feeding unit-side transmission gear; and a carriage-side position coupling the motor-side transmission gear and the carriage-side transmission gear; a sensor configured to output a detection signal which is changed depending on whether a document being fed by the feeding unit; and a control device configured to perform: a determination process of determining whether the document being fed by the feeding unit has jammed, based on the detection signal output from the sensor; and a driving process of, when it is determined that the jam has occurred, driving the motor in a direction of releasing a meshed state between the feeding unit-side transmission gear and the switching gear.

According to the above configuration, the motor is driven in a direction of releasing a meshed state between the feeding unit-side transmission gear and the switching gear. Thus, a meshed amount between the feeding unit-side transmission gear and the switching gear is reduced. Therefore, it is possible to reduce a burden of a jam solving job in a configuration of commonalizing a motor in a feeding reading of reading a document while feeding the document and in a moving reading of reading a document while moving a reading unit by a carriage.

(2) In the driving process, the control device may be configured to drive the motor until it reaches a position at which the feeding unit-side transmission gear and the switching gear are not contacted.

According to the above configuration, since the feeding unit-side transmission gear and the switching gear are not completely meshed, it is possible to reduce the burden of the jam solving job in the configuration of commonalizing the motor in the feeding reading and in the moving reading.

(3) The control device may be further configured to perform a reception process of receiving a solving command of the jam. In a case where the control device receives the solving command after starting the driving process, the control device may drive the motor in a direction of meshing the feeding unit-side transmission gear and the switching gear.

According to the above configuration, it is possible to approximate the switching gear to a state before a jam has occurred.

(4) After the feeding unit-side transmission gear and the switching gear are meshed, the control device may be configured to drive the motor in a direction of discharging the document.

According to the above configuration, even when the document remains after a user performs the jam solving job, it is possible to discharge the document to an outside of the image reading apparatus.

(5) The control device may be configured to, after driving the motor in the direction of discharging the document, stop the motor with the switching gear being located at the feeding unit-side position.

According to the above configuration, after performing the jam solving process, there is a high possibility that the user will again read the document in the feeding reading. Therefore, by switching the switching gear to the feeding unit-side position after performing the jam solving process, it becomes not necessary to perform the switching operation of the switching gear. Accordingly, it is possible to reduce the processing time of the re-reading.

(6) The control device may be further configured to perform a notification process of notifying an occurrence of the jam after the driving process.

According to the above configuration, compared to a configuration where the jam is notified before the driving process is performed, it is possible to reduce the jam solving job that is performed during the release of the meshed state between the feeding unit-side transmission gear and the switching gear.

(7) The image reading apparatus may further comprise: an urging member configured to urge the switching gear. In the moving reading, the urging member may urge the switching gear, which is located at the carriage-side position, in a direction for pressing the carriage-side transmission gear. In the feeding reading, the urging member may urge the switching gear, which is located at the feeding unit-side position, in a direction for pressing the feeding unit-side transmission gear.

According to the above configuration, when the switching gear is located at the carriage-side position, it is possible to strengthen the meshing between the switching gear and the carriage-side transmission gear by the urging member, so that it is possible to appropriately perform the moving reading. Incidentally, with the urging member, even when performing the feeding reading, the meshing between the switching gear and the feeding unit-side transmission gear is also strengthened as the meshing between the switching gear and the carriage-side transmission gear is strengthened. However, by performing the driving process, it becomes possible to weaken the meshing between the switching gear and the feeding unit-side transmission gear upon occurrence of a jam. Therefore, even with the above configuration, it is possible to reduce the burden of the jam solving job.

(8) When the switching gear is located at the carriage-side position, the urging member may be configured to urge the switching gear at a state where the urging member is less stretched, compared to a case where the switching gear is located between the carriage-side position and the feeding unit-side position. The control device may drive the motor in the driving process until the carriage-side transmission gear and the switching gear are meshed.

According to the above configuration, compared to a configuration where the driving of the motor is stopped at an intermediate position at which the switching gear is not meshed with both the feeding unit-side transmission gear and the carriage-side transmission gear, it is possible to more reduce a stretched amount of the urging member (e.g., spring), thereby prolonging the lifetime of the urging member.

(9) The image reading apparatus may further comprise: a planet gear mechanism comprising: a transmission gear. The transmission gear may be configured to mesh with the motor-side transmission gear; a sun gear coaxially fixed to the transmission gear; and the switching gear meshed with the sun gear and is configured to revolve around the sun gear. In a case where the switching gear is switched to the feeding unit-side position, the switching gear may mesh with the feeding unit-side transmission gear so as to transmit the driving force from the motor-side transmission gear to the feeding unit-side transmission gear via the planet gear mechanism. In a case where the switching gear is switched to the carriage-side position, the switching gear may mesh with the carriage-side transmission gear so as to transmit the driving force from the motor-side transmission gear to the feeding unit-side transmission gear via the planet gear mechanism. When it is determined that the jam has occurred in performing the feeding reading, the control device may be configured to perform the driving process to release the meshed state between the feeding unit-side transmission gear and the switching gear.

(10) The image reading apparatus may further comprise: an urging member configured to urge the switching gear. In a case where the switching gear is switched to the feeding unit-side position, the urging member may urge the switching gear in a direction for pressing the feeding unit-side transmission gear. In a case where the switching gear is switched to the carriage-side position, the urging member may urge the switching gear in a direction for pressing the carriage-side transmission gear.

What is claimed is:

1. An image reading apparatus comprising:
   a reading unit configured to read an image of a document;
   a feeding unit configured to feed the document;
   a carriage that holds the reading unit and is configured to move in a predetermined direction;
   a motor;
   a motor-side transmission gear configured to transmit power supplied from the motor;
   a feeding unit-side transmission gear configured to transmit the power to the feeding unit in a feeding reading of reading an image of the document, which is fed by the feeding unit, by using the reading unit;
   a carriage-side transmission gear configured to transmit the power to the carriage in a moving reading of reading an image of the document by using the reading unit while moving the carriage;
   a switching gear configured to be switched between:
      a feeding unit-side position coupling the motor-side transmission gear and the feeding unit-side transmission gear; and
      a carriage-side position coupling the motor-side transmission gear and the carriage-side transmission gear;
   a sensor configured to output a detection signal which is changed depending on whether a document being fed by the feeding unit; and a control device configured to perform:
- a determination process of determining whether the document being fed by the feeding unit has jammed, based on the detection signal output from the sensor; and
- a driving process of, when it is determined that the jam has occurred, driving the motor in a direction of releasing a meshed state between the feeding unit-side transmission gear and the switching gear.

2. The image reading apparatus according to claim 1, wherein in the driving process, the control device is configured to drive the motor until it reaches a position at which the feeding unit-side transmission gear and the switching gear are not contacted.

3. The image reading apparatus according to claim 2, wherein the control device is further configured to perform a reception process of receiving a solving command of the jam, and
wherein in a case where the control device receives the solving command after starting the driving process, the control device drives the motor in a direction of meshing the feeding unit-side transmission gear and the switching gear.

4. The image reading apparatus according to claim 3, wherein after the feeding unit-side transmission gear and the switching gear are meshed, the control device is configured to drive the motor in a direction of discharging the document.

5. The image reading apparatus according to claim 4, wherein the control device is configured to, after driving the motor in the direction of discharging the document, stop the motor with the switching gear being located at the feeding unit-side position.

6. The image reading apparatus according to claim 1, wherein the control device is further configured to perform a notification process of notifying an occurrence of the jam after the driving process.

7. The image reading apparatus according to claim 1, further comprising:
an urging member configured to urge the switching gear,
wherein in the moving reading, the urging member urges the switching gear, which is located at the carriage-side position, in a direction for pressing the carriage-side transmission gear, and
wherein in the feeding reading, the urging member urges the switching gear, which is located at the feeding unit-side position, in a direction for pressing the feeding unit-side transmission gear.

8. The image reading apparatus according to claim 7, wherein when the switching gear is located at the carriage-side position, the urging member is configured to urge the switching gear at a state where the urging member is less stretched, compared to a case where the switching gear is located between the carriage-side position and the feeding unit-side position, and
wherein the control device drives the motor in the driving process until the carriage-side transmission gear and the switching gear are meshed.

9. The image reading apparatus according to claim 1, further comprising:
a planet gear mechanism comprising:
- a transmission gear, wherein the transmission gear is configured to mesh with the motor-side transmission gear;
- a sun gear coaxially fixed to the transmission gear; and
- the switching gear meshed with the sun gear and is configured to revolve around the sun gear, wherein in a case where the switching gear is switched to the feeding unit-side position, the switching gear meshes with the feeding unit-side transmission gear so as to transmit the driving force from the motor-side transmission gear to the feeding unit-side transmission gear via the planet gear mechanism,
wherein in a case where the switching gear is switched to the carriage-side position, the switching gear meshes with the carriage-side transmission gear so as to transmit the driving force from the motor-side transmission gear to the feeding unit-side transmission gear via the planet gear mechanism, and
wherein when it is determined that the jam has occurred in performing the feeding reading, the control device is configured to perform the driving process to release the meshed state between the feeding unit-side transmission gear and the switching gear.

10. The image reading apparatus according to claim 9, further comprising:
an urging member configured to urge the switching gear,
wherein in a case where the switching gear is switched to the feeding unit-side position, the urging member urges the switching gear in a direction for pressing the feeding unit-side transmission gear, and
wherein in a case where the switching gear is switched to the carriage-side position, the urging member urges the switching gear in a direction for pressing the carriage-side transmission gear.

* * * * *